United States Patent
Kang

(10) Patent No.: US 8,474,045 B2
(45) Date of Patent: Jun. 25, 2013

(54) METHOD OF DETECTING PROGRAM ATTACKS

(75) Inventor: Gi-jin Kang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 492 days.

(21) Appl. No.: 12/758,163

(22) Filed: Apr. 12, 2010

(65) Prior Publication Data

US 2010/0263050 A1    Oct. 14, 2010

(30) Foreign Application Priority Data

Apr. 14, 2009  (KR) .................... 10-2009-0032323

(51) Int. Cl.
*G06F 11/00* (2006.01)
(52) U.S. Cl.
USPC .................... 726/23; 726/22; 726/24; 726/25
(58) Field of Classification Search
USPC ......................................... 726/23, 22, 24, 25
See application file for complete search history.

(56) References Cited

U.S. PATENT DOCUMENTS

| | | | |
|---|---|---|---|
| 5,224,160 A * | 6/1993 | Paulini et al. | 713/187 |
| 2002/0095388 A1 * | 7/2002 | Yu et al. | 705/67 |
| 2007/0220351 A1 * | 9/2007 | Jung et al. | 714/38 |
| 2009/0328211 A1 * | 12/2009 | Abraham et al. | 726/22 |

FOREIGN PATENT DOCUMENTS

| | | |
|---|---|---|
| JP | 2002351749 A | 12/2002 |
| JP | 2006318303 A | 11/2006 |
| KR | 1020070074308 A | 7/2007 |

* cited by examiner

*Primary Examiner* — Teshome Hailu
(74) *Attorney, Agent, or Firm* — Volentine & Whitt, PLLC

(57) ABSTRACT

A program data attack is detected during execution of an algorithm performed by an embedded system. The algorithm uses program data stored in the embedded system. The detection is performed by asserting a detection command signal, initializing a calculation register with a calculation result in response to assertion of the detection command signal, wherein the calculation result is produced by execution of the algorithm using the program data, and comparing the calculation result stored in the calculation register with a reference value included in the program data, wherein the reference value is a value of the calculation result expected to be obtained when the program data is not attacked from outside.

18 Claims, 5 Drawing Sheets

METHOD OF DETECTING PROGRAM ATTACKS

STATEMENT OF RELATED APPLICATION

This application claims priority under 35 U.S.C. §119 to Korean Patent Application No. 10-2009-0032323 filed on Apr. 14, 2009, the disclosure of which is hereby incorporated by reference in its entirety.

BACKGROUND

The inventive concept relates generally to methods of detecting attacks by hackers or other external influences. More particularly, the inventive concept relates to methods of detecting attacks that may damage information stored in a central processing unit (CPU) or change the contents of a program memory.

Modern electronic devices commonly incorporate security measures to prevent data theft, tampering, or other interference. For instance, devices storing sensitive customer information, such as smart cards and mobile communication devices, commonly encrypt stored or transmitted data to prevent it from being viewed by unauthorized users. Such devices may also implement system functions to prevent malicious code from interfering with normal hardware and software operations. Some systems even include specialized hardware or compiler based technology to enhance security functions, such as special parity checking components for CPU registers, or uniform branch timing. Although these techniques may increase the fabrication cost of modern devices and interfere with optimal performance of a CPU or other system components, they are commonly deemed necessary to the safe operation of the devices.

One example class of devices that has been the subject of serious security measures is embedded systems, such as credit cards or e-passports having a microprocessor unit (MCU). These devices may need to protect against several different types of attacks, including both electronic attacks as well as physical tampering. As examples, these attacks may include direct accessing of customer information or indirect access of customer information by inducing the MCU to change its operations to expose sensitive information.

To address these issues, product manufacturers have developed a variety of different anti-hacking technologies responsive to electronic or physical threats. As examples, light detectors have been developed to disable a device or execute an emergency routine if the device is opened in a lighted environment, or an inner insulation removal detector or an active shield removal detector to perform a similar function when a device is dismantled.

Unfortunately, conventional attack-detection technologies may not detect attacks in certain environments or in the presence of continual attacks. For example, a hacker may read signal values transmitted through a signal line by probing signals input into/output from the system, and thus, gain access to information in the system using the read signal values. In other instances, a hacker may change program data by using a glitch attack or a power attack at many points in the system through a laser attack. As a result, the hacker may recognize data stored in the program memory, and may change the data stored in the program memory using electric signals.

SUMMARY

Embodiments of the inventive concept provide methods and devices capable of detecting program attacks by testing for defects in program data fetched by a central processing unit.

According to one embodiment of the inventive concept, a method is provided for detecting a program data attack during execution of an algorithm. The algorithm is performed within an embedded system and uses program data. The method comprises asserting a detection command signal, initializing a calculation register with a calculation result produced by execution of the algorithm, and comparing the calculation result stored in the calculation register with a reference value included in the program data, wherein the reference value is a value of the calculation result expected to be obtained when the program data is not attacked from outside.

In certain embodiments, the method further comprises determining whether an additional calculation path is included between the initializing and the comparing, which form a main calculation path of the function. The initializing and the comparing are typically performed without compensation of the calculation result when there is no additional calculation path.

In certain embodiments, the additional calculation path comprises an exception, a subroutine call, a condition, or a loop. Where the additional calculation path comprises the exception, the calculation result used in the comparison is not affected by results obtained in a program section executed after the exception. Where the additional calculation path comprises the subroutine call, a compensation value is applied to the calculation result prior to the comparison. Where the additional calculation path comprises the condition statement, and the detection signal is asserted within the additional calculation path if the condition statement is satisfied, and the detection signal is asserted within the main calculation path if the condition is not satisfied. The calculation result used in the comparison is obtained from the additional calculation path or the main calculation path depending on which path asserts the detection signal.

In certain embodiments, the embedded system resides in a portable device comprising a microprocessor unit, such as a credit card or an electronic passport document.

In certain embodiments, the method further comprises determining whether an additional calculation path is included between the initializing and the comparing, which form a main calculation path of the function, and the initializing and the comparing are performed with compensation of the calculation result when there is an additional calculation path.

According to another embodiment of the inventive concept, an electronic device comprises a central processing unit, a program memory operatively connected to the central processing unit and storing program data to be used by an algorithm, the program data containing a reference value indicating a calculation result expected to be obtained when the program data is not attacked from outside. The device further comprises a detection command signal generator configured to generate a detection command signal to initiate an attack detection operation, a calculation register configured to store a calculation result produced by execution of the algorithm, and a comparison unit configured to compare the calculation result stored in the calculation register with the reference value.

BRIEF DESCRIPTION OF THE DRAWINGS

Embodiments of the inventive concept will be more clearly understood from the following detailed description taken in conjunction with the accompanying drawings. In the drawings, like reference numerals denote like features.

DETAILED DESCRIPTION OF THE EMBODIMENTS

Various embodiments will be described more fully hereinafter with reference to the accompanying drawings. The inventive concept may, however, be embodied in many different forms and should not be construed as being limited to only the illustrated embodiments. Rather, these embodiments are presented as teaching examples.

In general, embodiments of the inventive concept provide methods and devices in which electronic attacks, data tampering, or other forms of interference are prevented from affecting the integrity of program operations or stored data. In some embodiments, an attack is detected by performing a comparison between reference data reflecting a normal result of a program operation or algorithm, and actual data representing the actual result of the program operation. If the actual data does not match the reference data, an attack is detected.

The reference data is typically stored together with program data and loaded into a designated location, such as a reference register, when the program data is to be executed. The reference data typically indicates the intended result of a particular operation or algorithm defined by the program data. Thus, when the program operation is performed under normal conditions, it will produce the reference data. However, if an attack by a hacker or other source of interference occurs, the program operation will produce data that is different from the reference data.

Figure 1:
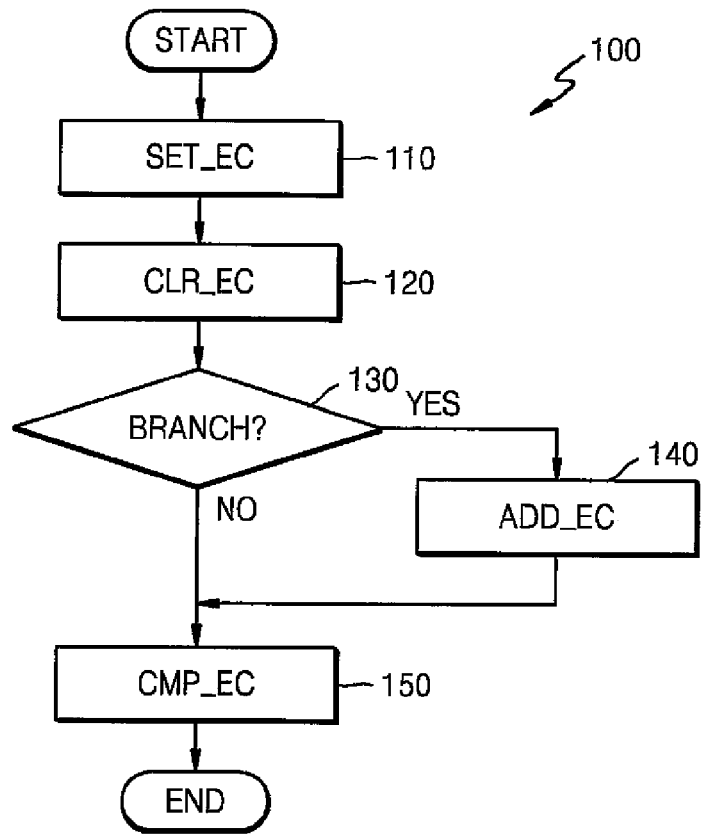
FIG. 1 is a flowchart illustrating a method of detecting a program attack in accordance with an embodiment of the inventive concept.

FIG. 1 is a flowchart illustrating a method 100 for detecting a program attack in accordance with an embodiment of the inventive concept. The method detects an external attack on program data when an algorithm within a program is executed. The method can be performed, for instance, in a device storing sensitive customer information. For explanation purposes, it will be assumed that the device is an embedded system.

Referring to FIG. 1, method 100 comprises a detection request operation 110, a initialization operation 120, an additional calculation path determining operation 130, a compensation value applying operation 140, and a comparison operation 150.

In detection request operation 110, an instruction is issued to detect a program data attack coming from outside the embedded system. This results in the activation of a detection command signal SR_EC stored in detection command register SET_EC.

Next, in initialization operation 120, a calculation register CLR_EC is initialized in response to the activation of detection command signal SR_EC. Calculation register CLR_EC stores a calculation result of a certain function to be performed by an algorithm in the program. In this example, initialization operation 120 and the function constitute part of a main calculation path of the program.

In additional calculation path determining operation 130, a determination is made as to whether an additional calculation path is included in the main calculation path. The additional calculation path may be indicated, for instance, by a branch address stored in an address register ADD_EC. The additional calculation path may comprise, for instance, an interrupt, an exception, a subroutine call, a condition, or a loop.

Where an additional calculation path is not included in the main calculation path, main calculation path initialization operation 120 and comparison operation 150, are performed. However, where an additional calculation path is included in the main calculation path, a compensation value applying operation 140 is further performed between initialization operation 120 and comparison operation 150. Finally, comparison operation 150 compares the calculation result stored in the calculation register with a reference value contained in program data.

The reference value is an calculation result expected to be obtained by the program in the absence of an attack on the program from outside the embedded system. The actual calculation result may be different from the reference value if an attack has occurred.

Where comparison operation 150 determines that the calculation result and the reference value are equal to each other, there is deemed to be no attack by a hacker. Where there is deemed to be no attack by a hacker, calculations are continuously performed after comparison result 150. However, where the calculation result and the reference value are not equal, an attack is detected and calculations to be performed after comparison operation 150 may be omitted and/or replaced by attack handling operations. In other words, the embedded system may be informed of an attack and thereafter initiate post-attack processes. Such post-attack processes may include, for instance, termination of the program or function, or execution of other coping processes. Various post-attack processes will be described below.

Figure 2:
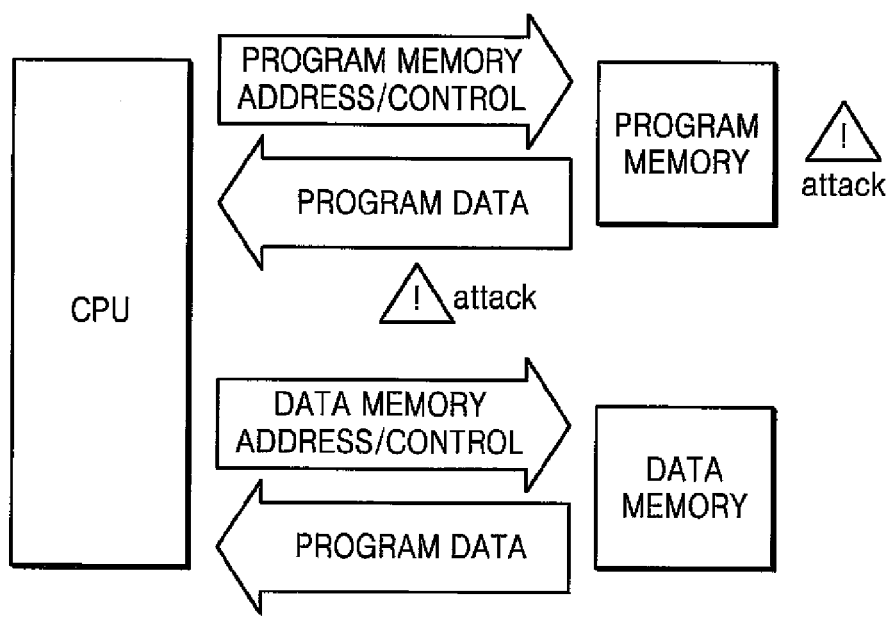
FIG. 2 is a block diagram illustrating damage or a change in program data due to an external attack.

FIG. 2 is a block diagram illustrating damage or a changes in program data that may occur due to an external attack on an embedded system.

Referring to FIG. 2, the embedded system comprises a CPU, a program memory storing programs, and a data memory temporarily storing calculation results. The CPU executes a certain algorithm by fetching the program data stored in the program memory, and stores temporary results or final results of the calculations obtained during the execution of the algorithm, in the data memory. During operation of the embedded system, a hacker may attack the program memory or a transmission path of the program memory in various ways to damage or change the data stored in the program memory.

Where the program data is changed due to an attack by a hacker, the calculation results of the algorithm may be different from the calculation results that are obtained when the embedded system operates normally. The hacker may change the program data using any of several techniques, such as inferring the program data in the program memory by using calculation results which vary depending on the changed program data, and then extracting certain program data or deforming the program data. According to embodiments of the inventive concept, changes in the program data stored in the embedded system due to a hacker attack are detected during execution of a program or function.

Figure 3:
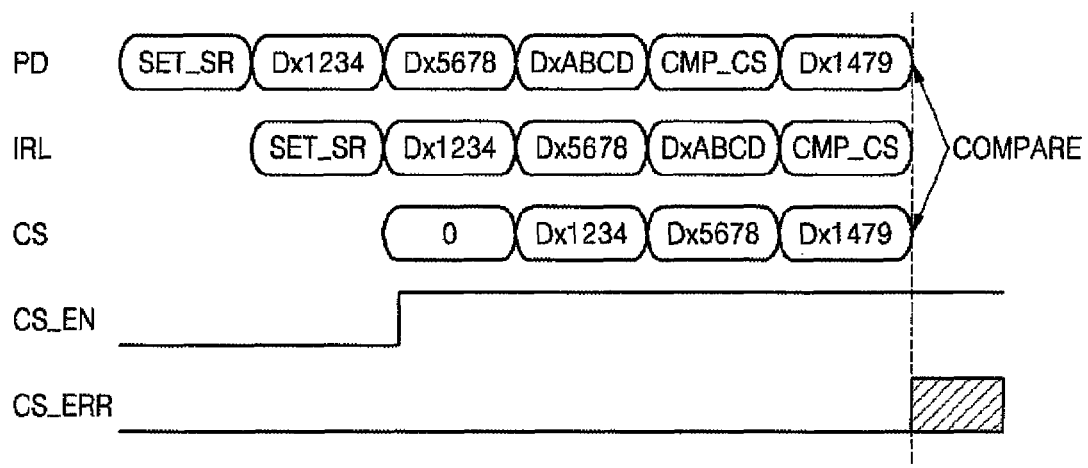
FIG. 3 is a data timing diagram illustrating an example when there is no program data attack in accordance with an embodiment of the present inventive concept.

FIG. 3 is a data timing diagram illustrating an example when there is no program data attack in accordance with an embodiment of the present inventive concept.

Referring to FIG. 3, the CPU sequentially fetches various elements of program data PD to perform a function. In particular, the CPU fetches a command SET_SR to enable detection command signal SR_EC, and then fetches data 1234, data 5678, data ABCD, comparison direction signal CMP_CS, and reference value 1479.

An internal register IRL stores signals output from the program data based on a clock signal that controls operations of the system. The CPU may refer to or use a signal stored in internal register IRL at any time. Calculation results generated by the program or function are stored sequentially in a calculation register CS. For instance, in FIG. 3, calculation register CS sequentially stores data 0, 1234, 5678, and 1479.

Reference value 1479 output from program data PD and calculation result 1479 stored in calculation register CS are compared with each other in response to a comparison direction signal CMP_CS issued from program data PD and stored in internal register IRL. In the example of FIG. 3, since the reference value and the calculation result are the same as each other, that is, they are both 1479, it may be determined that there is no attack from a hacker or the program data has not changed or damaged due to an attack by a hacker.

Enabling detection command signal SR_EC causes internal comparison signal CS_EN to be enabled when the calculation results are stored in calculation register CS. Where internal comparison signal CS_EN is enabled, reference value 1479 output from program data PD and calculation result 1479 stored in calculation register CS are compared with each other in response to comparison direction signal CMP_CS stored in internal register IRL. When the reference value and the calculation result are not equal to each other, an internal error signal CS_ERR is activated.

In various alternative embodiments of the inventive concept, operations for detecting attacks may be implemented in different parts of an algorithm, function, or program. In the example of FIG. 3, operations for detecting attacks are implemented in a main program path. In other embodiments, they may be implemented in additional calculation paths, such as during interrupt or exception handling, subroutine execution, conditions, or loops outside the main program path. The descriptions of FIGS. 4 through 10 below present various techniques for detecting attacks in programs including various additional calculation paths.

Figure 4:
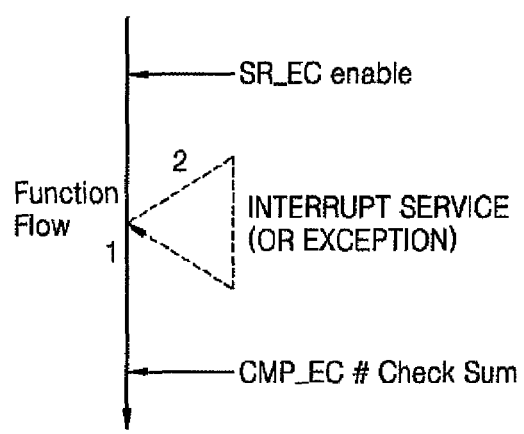
FIG. 4 is a program flow diagram illustrating a program operation in which an interrupt or an exception occurs during performance of a function.

FIG. 4 is a program flow diagram illustrating a program operation in which an interrupt or an exception occurs during performance of a function.

A downward arrow in FIG. 4 denotes the calculation flow of the function, and arrows in the horizontal direction denote program data. These same notations are applied to other drawings described below.

Referring to FIG. 4, detection command signal SR_EC is asserted during a main calculation path 1 to initiate attack detection. Thereafter, an additional calculation path 2 comprising an interrupt or exception occurs in the middle of main calculation path 1. As a result, calculation results obtained in the additional calculation path 2 may be taken into account in addition to those obtained in main calculation path 1.

The calculation results obtained from main calculation path 1 and additional calculation path 2 generally differ from each other. Accordingly, the CPU may exclude the calculation results obtained after the interrupt or the exception occurs, from main calculation path 1. In particular, the CPU may generally recognize the point when the interrupt or the exception occurs and the point when the flow returns to main calculation path based on internal signals, and accordingly, the CPU may ignore calculation results obtained from additional calculation path 2.

Figure 5:
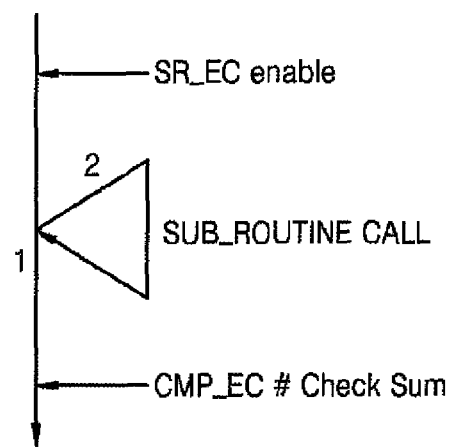
FIG. 5 is a program flow diagram illustrating a program operation in which a subroutine call is included in a main calculation path of a function.

FIG. 5 is a program flow diagram illustrating a program operation in which a subroutine call is included in a main calculation path of a function.

Referring to FIG. 5, detection command signal SR_EC is again asserted during main calculation path 1 to initiate attack detection. Where a subroutine 2 is called while the function is being calculated according to, processes similar to those illustrated in FIG. 4 are performed. In this case, calculation results obtained by the added subroutine call may be applied to the final calculation results, without interfering with the comparison between the calculation results and the reference value. The calculation processes of the function or program may be recognized by the CPU, and calculation results produced by the additional calculation path such as the subroutine call may be predicted, in addition to the calculation results produced by the main calculation path. As a result, it is possible to compensate for affects on the calculation result caused by the subroutine.

In the example of FIG. 3, suppose that data 1234, data 5678, and data ABCD are processed in main calculation path 1, and data 1234, data 5689, and data ABCD are processed in additional calculation path 2. Data 5678 processed in main calculation path 1 and data 5689 processed in additional calculation path 2 differ from each other, and the difference may be compensated for purposes of the comparison used to detect attacks. The difference between data 5689 and data 5678 may be compensated by FFEF applied to a path of the subroutine call, which is additional calculation path 2. The compensation of such difference is within the grasp of those skilled in the art, and therefore a detailed description of the compensation operation will not be provided here.

Figure 6:
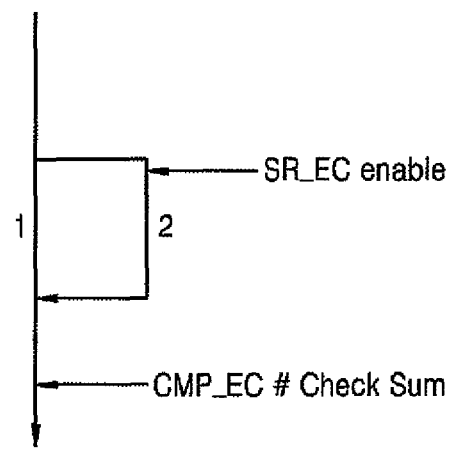
FIG. 6 is a program flow diagram illustrating a program operation in which a detection command signal is included in an additional calculation path when the main calculation path of the function includes a condition statement.

FIG. 6 is a program flow diagram illustrating a program operation in which detection command signal SR_EC is asserted within additional calculation path 2 when the main calculation path of the function includes a condition statement. Thus attack detection may be performed when one part of the condition is satisfied but otherwise the attack detection may be omitted.

Figure 7:
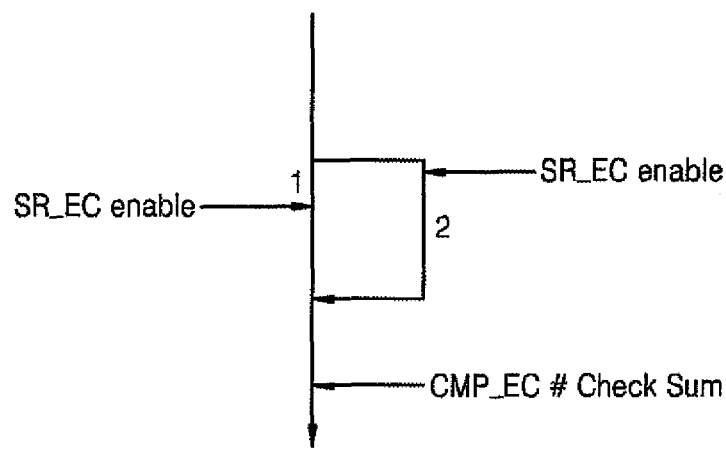
FIG. 7 is a program flow diagram illustrating a program operation in which the detection command signal is included in both the main calculation path and the additional calculation path when the main calculation path of the function includes a condition statement.

FIG. 7 is a program flow diagram illustrating a program operation in which detection command signal SR_EC is asserted in both additional calculation path 2 and main calculation path 1 to initiate attack detection. Thus, attack detection may be performed whether or not a condition is satisfied.

Where detection command signal SR_EC is enabled only in additional calculation path 2 as shown in FIG. 6, the reference value and a calculation result obtained in main calculation path 1 are not compared with each other. Rather, the reference value and the calculation result obtained in additional calculation path 2 are compared with each other.

As shown in FIG. 7, where detection command signal SR_EC is enabled in main calculation path 1 and additional calculation path 2, the reference value may be compared with the calculation result of main calculation path 1 or additional calculation path 2, based on the result of the condition. Where the reference value and the calculation result of additional calculation path 2 are compared with each other, a compensation value is applied to the calculation result for purposes of comparison operation 150.

Figure 8:
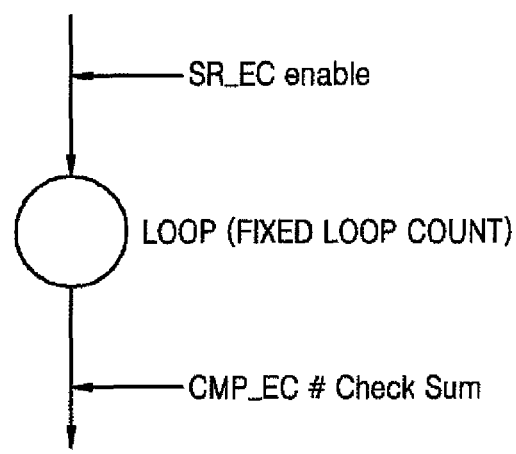
FIG. 8 is a program flow diagram illustrating a program operation in which the main calculation path comprises a loop having a fixed repetition number.

FIG. 8 is a program flow diagram illustrating a program operation in which the main calculation path comprises a loop having a fixed repetition number.

As shown in FIG. 8, the loop having the fixed repetition number (fixed loop count) is included in the main calculation path. This program configuration is susceptible to the same type of attack detection as a single main calculation path. Thus, additional processes, such as compensation, are not required in order to properly perform comparison operation 150.

Figure 9:
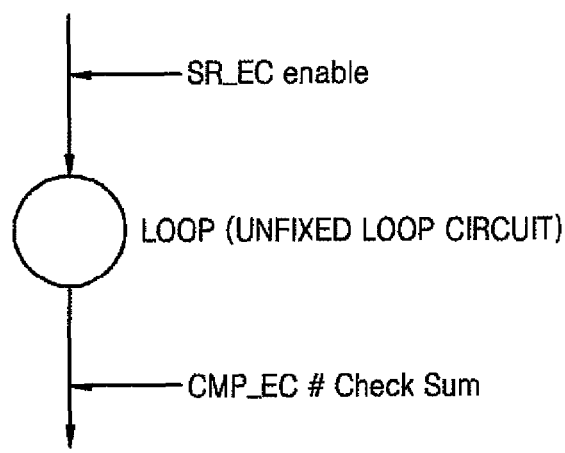
FIG. 9 is a program flow diagram illustrating a program operation in which a loop having a non-fixed repetition number is included in the main calculation path of the function, and the detection command signal is asserted outside the loop.

FIG. 9 is a program flow diagram illustrating a program operation in which a loop having a non-fixed repetition number is included in the main calculation path of the function, and detection command signal SR_EC is asserted outside the loop.

As shown in FIG. 9, the repetition number of the loop is determined according to a variable applied from outside the system, and thus, the reference value may not be defined. Therefore, the program data attack is not detected.

Figure 10:
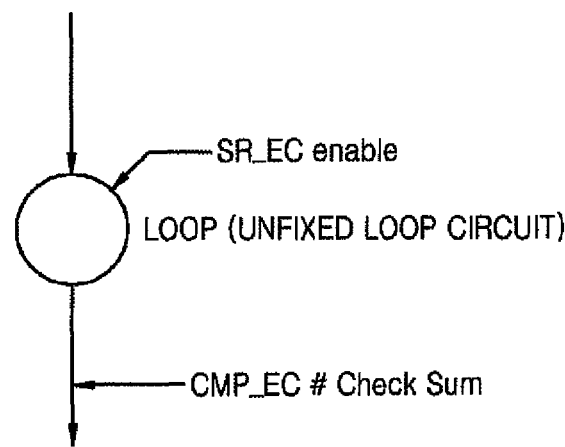
FIG. 10 is a program flow diagram illustrating a program operation in which the loop having the non-fixed repetition number is included in the main calculation path of the function and the detection command signal is asserted within the loop.

FIG. 10 is a program flow diagram illustrating a program operation in which the loop having the non-fixed repetition number is included in the main calculation path of the function and detection command signal SR_EC is asserted within the loop.

As shown in FIG. 10, even though the repetition number of the loop is determined according to a variable applied from outside the system, because detection command signal SR_EC exists in the loop, calculation register CS is initialized whenever the loop is performed. Therefore, the reference value may be set.

As described above, the method of detecting the program data attack may be applied to every case except for the case shown in FIG. 9. In addition, according to the method of detecting the program data attack, the fetching of the wrong program data due to a power defect or a glitch in the program memory or bus may be detected, as well as the change in the program data due to the external attack.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended.

What is claimed is:

1. A method of detecting a program data attack during execution of an algorithm using program data within an embedded system, the method comprising:
   asserting a detection command signal;
   initializing a calculation register with a calculation result produced by execution of the algorithm;
   comparing the calculation result stored in the calculation register with a reference value included in the program data, wherein the reference value is a value of the calculation result expected to be obtained when the program data is not attacked from outside; and
   determining whether an additional calculation path is included between the initializing and the comparing, which form a main calculation path of the function,
   wherein the initializing and the comparing are performed without compensation of the calculation result when there is no additional calculation path.

2. The method of claim 1, wherein the additional calculation path comprises an exception, a subroutine call, a condition, or a loop.

3. The method of claim 2, wherein the comparing is performed as a consequence of determining that the additional calculation does not comprise an interrupt.

4. The method of claim 2, further comprising:
   where the additional calculation path comprises the exception, the calculation result used in the comparison is not affected by results obtained in a program section executed after the exception.

5. The method of claim 2, wherein when the additional calculation path comprises the subroutine call, a compensation value is applied to the calculation result prior to the comparison.

6. The method of claim 2, wherein when the additional calculation path comprises the condition statement, and the detection signal is asserted within the additional calculation path if the condition statement is satisfied, and the detection signal is asserted within the main calculation path if the condition is not satisfied.

7. The method of claim 6, wherein the calculation result used in the comparison is obtained from the additional calculation path or the main calculation path depending on which path asserts the detection signal.

8. The method of claim 2, wherein when the additional calculation path comprises the loop, the detection command signal is asserted before the loop, and a repetition number of the loop is fixed, the comparison is performed after the loop.

9. The method of claim 8, wherein the comparison is performed as a consequence of determining that the repetition number of the loop is not determined by a signal input from outside the system.

10. The method of claim 2, wherein when the additional calculation path comprises the loop and the detection command signal is enabled during an iteration of the loop, the comparison is performed using a calculation result from at least one loop.

11. The method of claim 1, wherein the embedded system resides in a portable device comprising a microprocessor unit.

12. The method of claim 1, wherein the embedded system is located in a credit card or an electronic passport document.

13. A method of detecting a program data attack during execution of an algorithm using program data within an embedded system, the method comprising:
   asserting a detection command signal;
   initializing a calculation register with a calculation result produced by execution of the algorithm;
   comparing the calculation result stored in the calculation register with a reference value included in the program data, wherein the reference value is a value of the calculation result expected to be obtained when the program data is not attacked from outside; and determining whether an additional calculation path is included between the initializing and the comparing, which form a main calculation path of the function, wherein the initializing and the comparing are performed with compensation of the calculation result when there is an additional calculation path.

14. An electronic device, comprising:

a central processing unit (CPU);

a program memory operatively connected to the CPU and storing program data to be used by an algorithm, the program data containing a reference value indicating a calculation result expected to be obtained when the program data is not attacked from outside;

a detection command signal generator configured to generate a detection command signal to initiate an attack detection operation;

a calculation register configured to store a calculation result produced by execution of the algorithm; and a comparison unit configured to compare the calculation result stored in the calculation register with the reference value wherein the algorithm comprises a main calculation path and an additional calculation path, and wherein the device determines whether the additional calculation path resides between portions of the algorithm that perform initialization and portions that perform comparison of the calculation result with the reference value; and wherein the initialization is performed with compensation when it is determined that an additional calculation path resides between the portions of the algorithm that perform the initialization and the portions that perform the comparison.

15. The device of claim 14, wherein the electronic device comprises a portable electronic instrument capable of facilitating the exchange of currency.

16. The device of claim 14, wherein the additional calculation path comprises an exception, a subroutine call, a condition, or a loop.

17. The device of claim 16, wherein when the additional calculation path comprises the subroutine call, a compensation value is applied to the calculation result prior to the comparison.

18. The device of claim 16, wherein when the additional calculation path comprises the exception, the calculation result used in the comparison is not affected by results obtained in a program section executed after the exception.

* * * * *